(12) United States Patent
Chen

(10) Patent No.: US 7,059,350 B2
(45) Date of Patent: Jun. 13, 2006

(54) AIRFLOW CONTROLLING MECHANISM

(76) Inventor: Hsin-Chi Chen, 5F, No. 140, Yu-Hseug Rd., Taiping City, Taichung Hsien (TW)

( * ) Notice: Subject to any disclaimer, the term of this patent is extended or adjusted under 35 U.S.C. 154(b) by 330 days.

(21) Appl. No.: 10/434,089

(22) Filed: May 9, 2003

(65) Prior Publication Data

US 2004/0221901 A1    Nov. 11, 2004

(51) Int. Cl.
*F16K 11/85* (2006.01)
(52) U.S. Cl. ............... 137/625.23; 137/625.22
(58) Field of Classification Search ........... 137/625.22, 137/625.23
See application file for complete search history.

(56) References Cited

U.S. PATENT DOCUMENTS

| | | | | |
|---|---|---|---|---|
| 28,552 A | * | 6/1860 | Bennett | 137/625.22 |
| 72,750 A | * | 12/1867 | Morse | 137/625.22 |
| 200,728 A | * | 2/1878 | Jones | 137/625.22 |
| 247,641 A | * | 9/1881 | Hayes | 137/625.22 |
| 330,669 A | * | 11/1885 | Bennett | 137/625.23 |
| 343,911 A | * | 6/1886 | Maas | 137/625.22 |
| 630,124 A | * | 8/1899 | Stage | 137/625.22 |
| 660,010 A | * | 10/1900 | Ezell | 137/625.22 |
| 2,324,576 A | * | 7/1943 | Gurries | 137/625.22 |
| 2,907,349 A | * | 10/1959 | White | 137/625.23 |
| 4,253,494 A | * | 3/1981 | Cooke | 137/625.23 |
| 4,800,924 A | * | 1/1989 | Johnson | 137/625.23 |

* cited by examiner

*Primary Examiner*—John Rivell
(74) *Attorney, Agent, or Firm*—Dennison, Schultz, Dougherty & MacDonald

(57) ABSTRACT

An airflow controlling mechanism including: a pneumatic cylinder having a cylinder body, an air chamber being formed in the cylinder body, a forward and a backward vents respectively passing through one end of the cylinder body for communicating the air chamber with outer side; an air valve having an annular body section, one end face of the air valve abutting against one end face of the cylinder body, two extension vents respectively extending through the body section, the openings of two ends of each extension vent being respectively positioned one end face of the body section and an inner circumference of the body section, the openings of the two extension vents positioned on the end face of the body section respectively communicating with the forward and backward vents; and an adjustment member having a base section coaxially accommodated in the body section, whereby the adjustment member can be turned between a clockwise position and a counterclockwise position, the circumference of the base section abutting against the inner circumference of the body section, an air passage radially extending through the base section, an opening of one end of the air passage being an outlet formed on the circumference of the base section for communicating with the air passage and a corresponding extension vent.

5 Claims, 7 Drawing Sheets

AIRFLOW CONTROLLING MECHANISM

BACKGROUND OF THE INVENTION

The present invention is related to a pneumatic tool, and more particularly to an improved airflow controlling mechanism.

FIGS. 1 and 2 show a conventional controlling mechanism of a pneumatic tool for controlling airflow direction and amount. A controlling disc 3 is coaxially accommodated in an extension air chamber 2 of a cylinder 1. One face of the controlling disc 3 abuts against a wall of the close end of the air chamber 2. The wall of the air chamber 2 is formed with two directional vents 4. The bottom of the annular wall of the air chamber 2 is formed with an inlet 5 for communicating with external air source. The controlling disc 3 is formed with a radial air passage 6. Two ends of the air passage 6 respectively communicate with the inlet 5 and a corresponding directional vent 4, whereby the external high pressure air is conducted from the inlet 5 through the air passage 6 and the directional vent 4 into the air chamber of the other end of the cylinder 1. Accordingly, the rotational direction of the pneumatic tool can be controlled. Moreover, by means of changing the amount of the airflow, the rotational speed of the pneumatic tool can be adjusted.

In the above conventional controlling mechanism of the pneumatic tool, the face of the controlling disc 3 abuts against the close end of the extension air chamber 2 to restrict the airflow from escaping. However, this can hardly achieve an optimal airtight effect. As a result, leakage often takes place in the conventional pneumatic tool to affect the operation thereof. In the case that the face of the controlling disc and the close end of the extension air chamber are manufactured at higher precision for achieving better airtight state, the manufacturing cost will be greatly increased and the airtight effect still cannot be ensured.

SUMMARY OF THE INVENTION

It is therefore a primary object of the present invention to provide an improved airflow controlling mechanism which is able to ensure the airtight state of the airflow passage and avoid escape of the air.

According to the above object, the airflow controlling mechanism of the present invention includes: a pneumatic cylinder having a cylinder body, an air chamber being formed in the cylinder body, a forward and a backward vents respectively passing through the wall of one end of the cylinder body for communicating the air chamber with outer side of the cylinder body; an air valve having an annular body section, one end face of the air valve abutting against one end face of the cylinder body, two extension vents respectively extending through the body section in predetermined direction, the openings of two ends of each extension vent being respectively positioned one end face of the body section and an inner circumference of the body section, the openings of the two extension vents positioned on the end face of the body section respectively communicating with the forward and backward vents; and an adjustment member having a disc-like base section with a certain thickness, the base section being coaxially accommodated in the body section, whereby the adjustment member can be turned between a clockwise position and a counterclockwise position, the circumference of the base section abutting against the inner circumference of the body section, an air passage radially extending through the base section, an opening of one end of the air passage being an outlet formed on the circumference of the base section in a predetermined position for communicating with the air passage and a corresponding extension vent.

The present invention can be best understood through the following description and accompanying drawings wherein:

DETAILED DESCRIPTION OF THE PREFERRED EMBODIMENT

Figure 1:
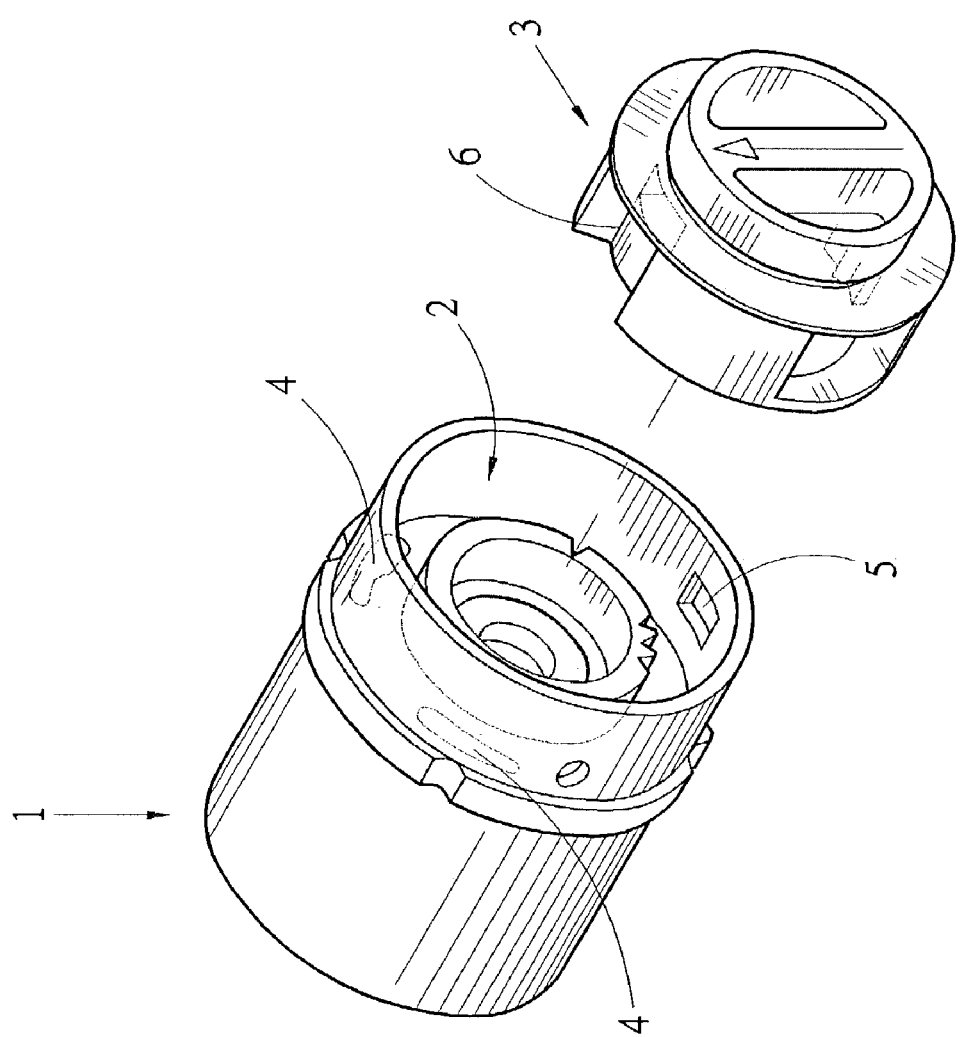
FIG. 1 is a perspective exploded view of a conventional airflow controlling mechanism of a pneumatic tool.
Figure 2:
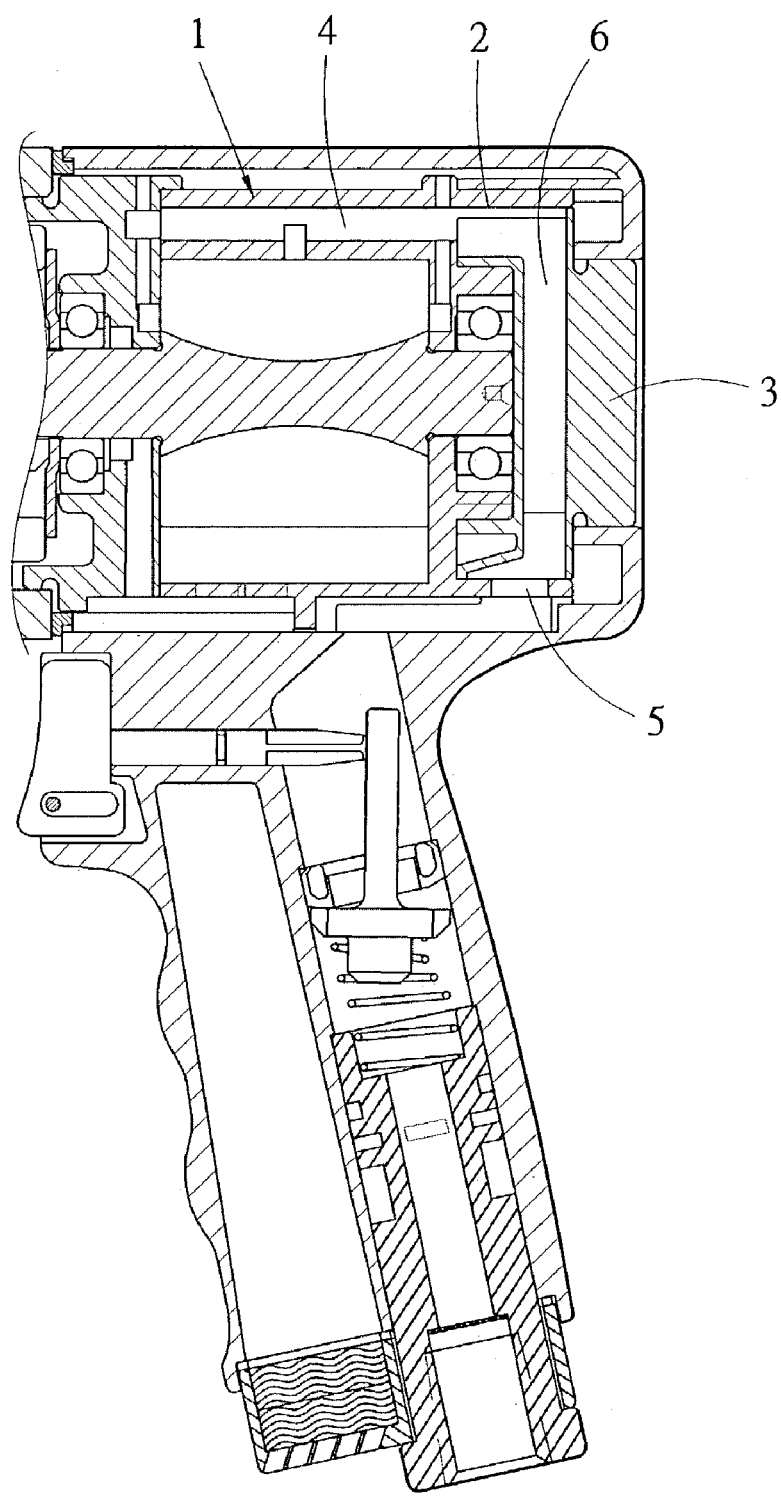
FIG. 2 is a sectional view of the conventional airflow controlling mechanism of the pneumatic tool.
Figure 3:
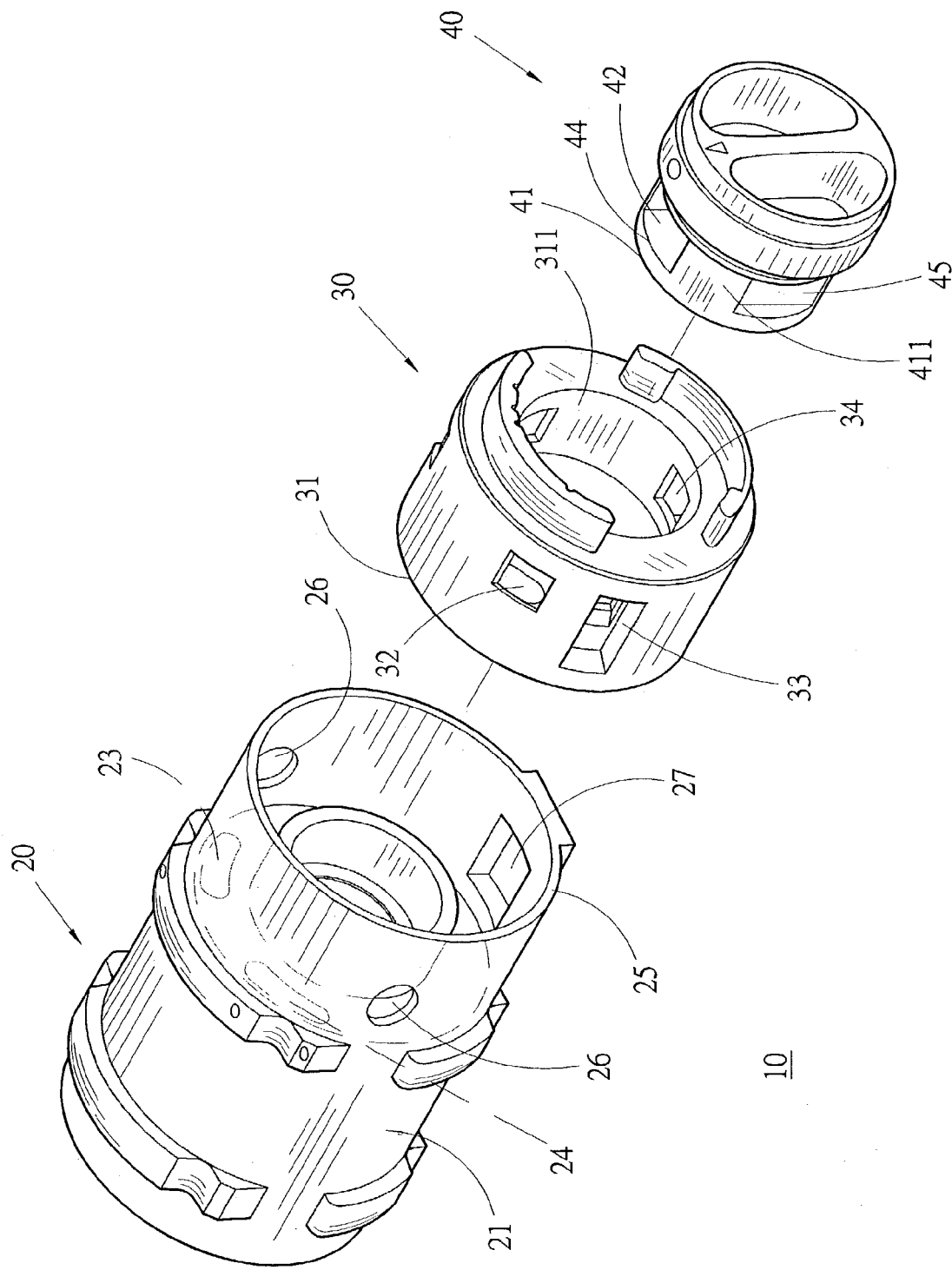
FIG. 3 is a perspective exploded view of the airflow controlling mechanism of the present invention.
Figure 4:
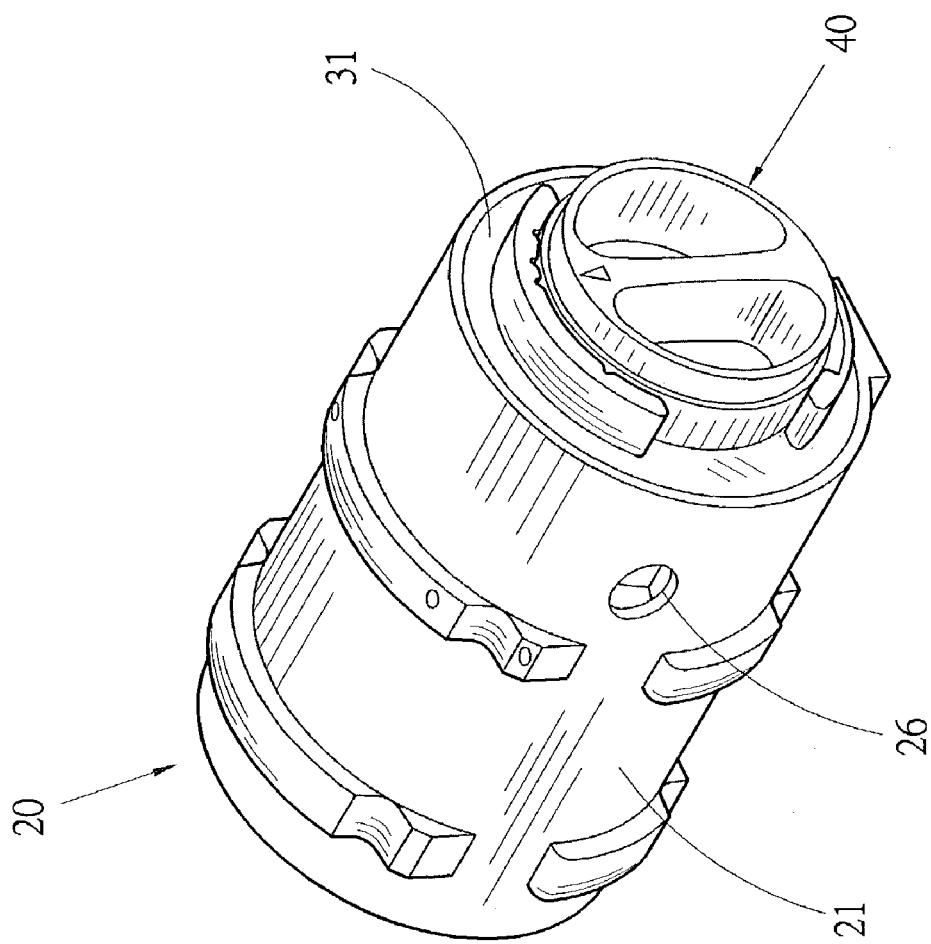
FIG. 4 is a perspective assembled view of the airflow controlling mechanism of the present invention.

Please refer to FIGS. 3 to 8. The airflow controlling mechanism 10 of the present invention includes a pneumatic cylinder 20, an air valve 30 and an adjustment member 40.

The pneumatic cylinder 20 has a cylinder body 21 with a certain length. An air chamber 22 rightward extends from left end face of the cylinder body 21. A forward and a backward vents 23, 24 respectively pass through the wall of right end of the cylinder body 21 for communicating the air chamber 22 with the outer side of the right end of the cylinder body 21. An extension annular wall 25 coaxially rightward extends from the right end of the cylinder body 21. Two lateral through holes 26 respectively pass through front and rear sides of the annular wall 25. A bottom through hole 27 passes though the bottom of the annular wall 25.

The air valve 30 has an annular body section 31 with a certain thickness and inner diameter. The air valve 30 is coaxially located and accommodated in the annular wall 25. One end of the air valve 30 abuts against the right end face of the cylinder body 21 for sealing the forward and backward vents 23, 24. Two extension vents 32 respectively inward extend from the end of the body section 31. The positions of the extension vents 32 are adjacent to and correspond to the forward and backward vents 23, 24. The extension vents 32 further windingly extend to the inner circumference 311 of the body section 31. Two exhaustion ports 33 are formed on the body section 31. The axes of the exhaustion ports 33 are perpendicular to the axis of the body section 31. The exhaustion ports 33 respectively coaxially communicate with the lateral through holes 26 of the pneumatic cylinder 20. An intake 34 is formed through the bottom of the body section 31. The axis of the intake 34 is perpendicular to the axis of the body section 31. The intake 34 coaxially communicates with the bottom through hole 27.

The adjustment member 40 has a disc-like base section 41 with a certain thickness and outer diameter. The base section 41 is coxially accommodated in the body section 31. The circumference 411 of the base section 41 abuts against the inner circumference 311 of the body section for sealing the respective openings formed on the inner circumference. The base section 41 abuts against the inner circumference 311 to a certain airtight extent. The adjustment member 40 can be turned between a counterclockwise position and a clockwise position. An air passage 42 radially passes through the circumference 411 of the base section 41 from an upper position to a lower position. Two opposite ends of the air passage 42 are respectively an inlet 43 and an outlet 44 formed on the circumference 411. Two exhaustion cuts 45 are respectively formed on the circumference 411 of the base section in a front and a rear positions opposite to each other. The exhaustion cuts 45 form corresponding exhaustion passages 46 between the circumference 411 of the base section 41 and the inner circumference 311 of the body section 31. The exhaustion passages 46 communicate with the corresponding exhaustion ports 33 of the air valve 30.

When the air valve 30 is located and accommodated in the extension annular wall 25, one end of the body section 31 and the circumference thereof snugly attach to the right end face of the cylinder body 21 and the inner circumference of the extension annular wall 25 in a certain airtight state. Therefore, the air is prevented from improperly flowing between the air valve and the cylinder body 21. The extension vents 32, exhaustion ports 33 and intake 34 formed on the body section 31 respectively communicate with the corresponding forward and backward vents 23, 24, lateral through holes 26 and bottom through hole 27 of the cylinder 20 to form an airflow passage.

The circumference 411 of the base section 41 of the adjustment member 40 abuts against the inner circumference 311 of the body section 31, whereby the openings of the extension vents 32, exhaustion ports 33 and the intake 34 are blocked. When the base section 41 is moved between the counterclockwise position and the clockwise position, the air passage 42 can communicate the intake 34 and a corresponding extension vent so as to control the position where the air goes into the air chamber 22 and thus change the rotational direction of the pneumatic tool.

Figure 5:
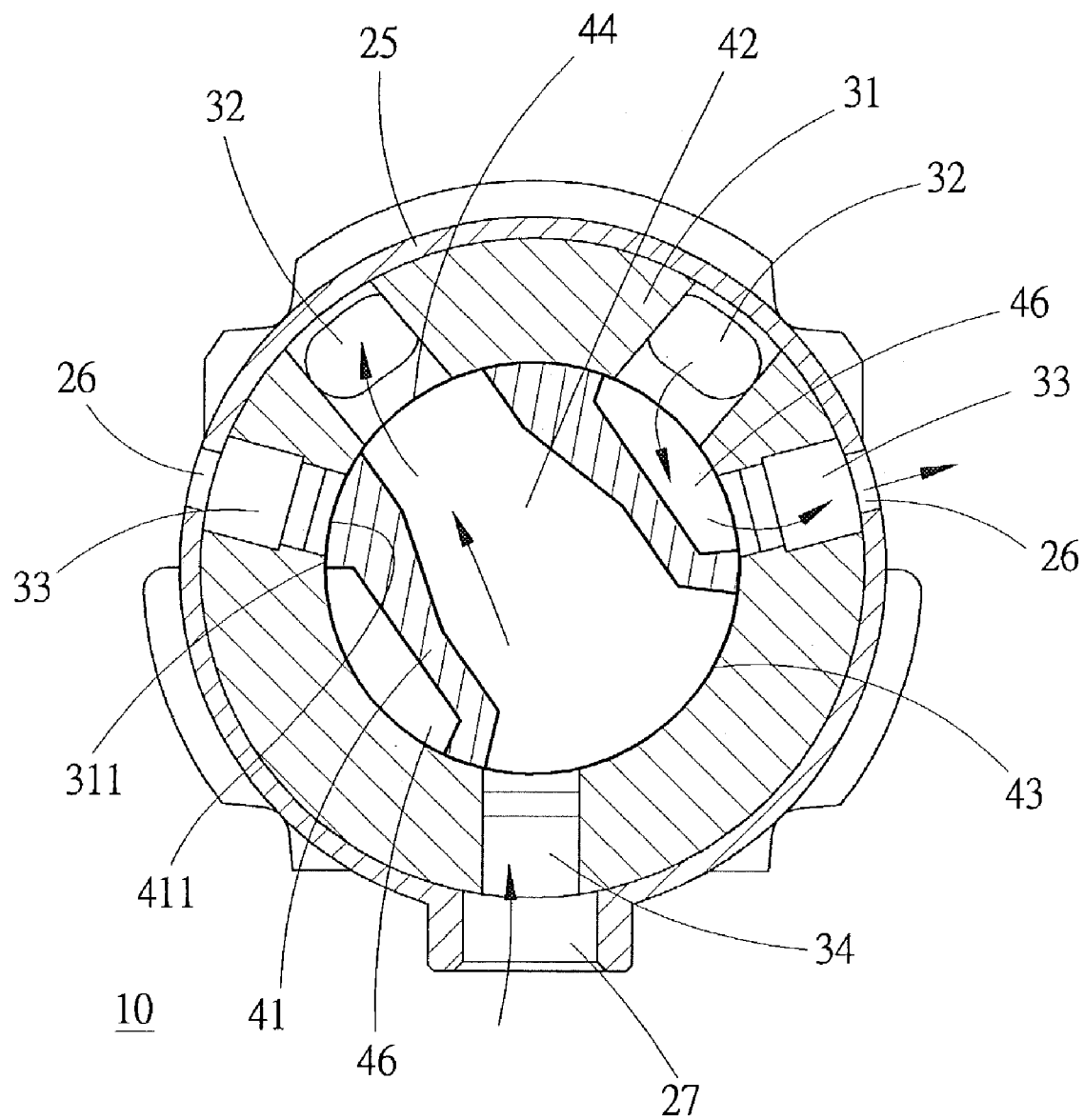
FIG. 5 is a sectional view of the airflow controlling mechanism of the present invention, in which the adjustment member is positioned in a counterclockwise position.

In further detail, referring to FIG. 5, when the base section 41 is positioned in the counterclockwise position, the air passage 42 communicates with the inlet 43 and the intake 34, while the outlet 44 communicates with the backward vent 24. Accordingly, the external air can go through the backward vent 24 into the air chamber 22. At the same time, the exhaustion passage 46 of the adjustment member 40 communicates with the forward vent 23 and the exhaustion port 33 adjacent thereto. Accordingly, after acting, the air in the air chamber 22 can flow out of the cylinder 20. The exhaustion passage and the above intake passage cooperatively form a continuous airflow path of the pneumatic tool.

Figure 6:
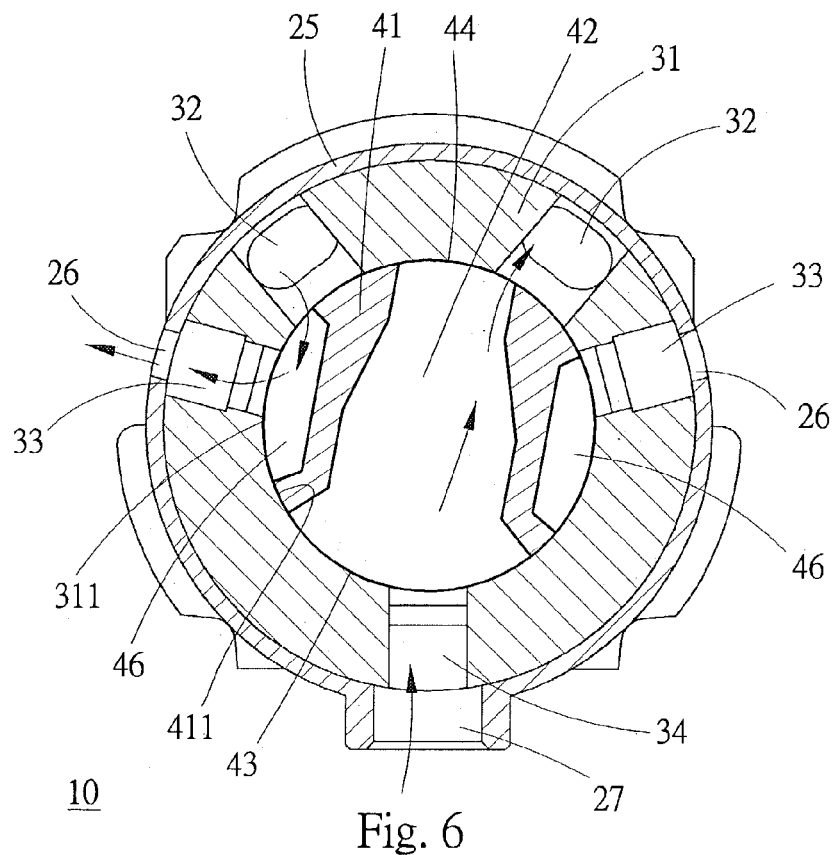
FIG. 6 is a sectional view of the airflow controlling mechanism of the present invention, in which the adjustment member is positioned in a clockwise position.
Figure 7:
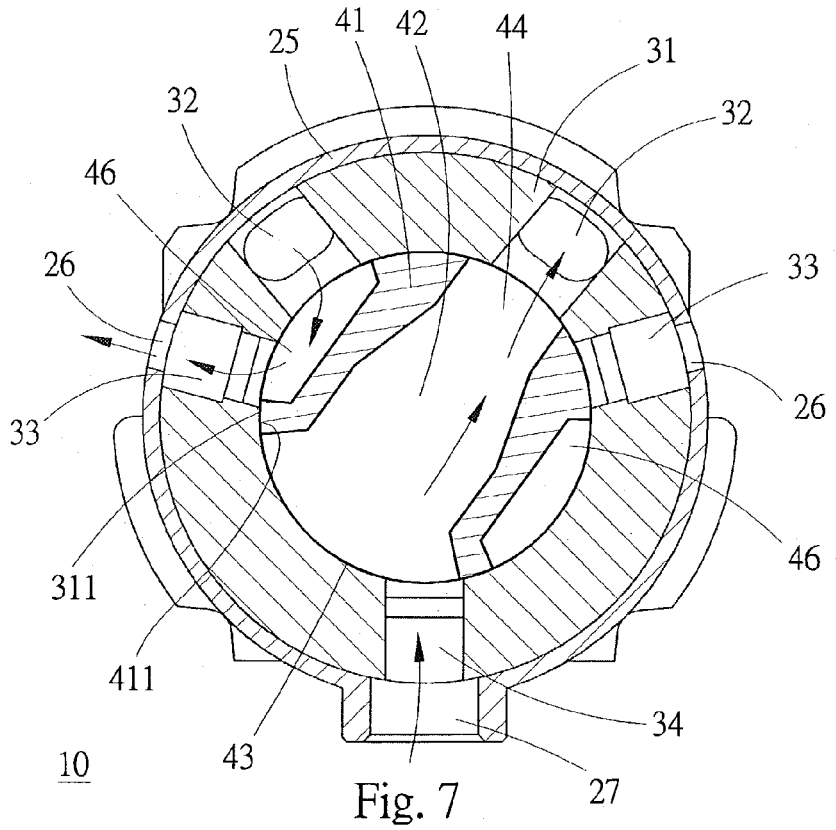
FIG. 7 is a sectional view of the airflow controlling mechanism of the present invention, in which the adjustment member is positioned in another clockwise position.
Figure 8:
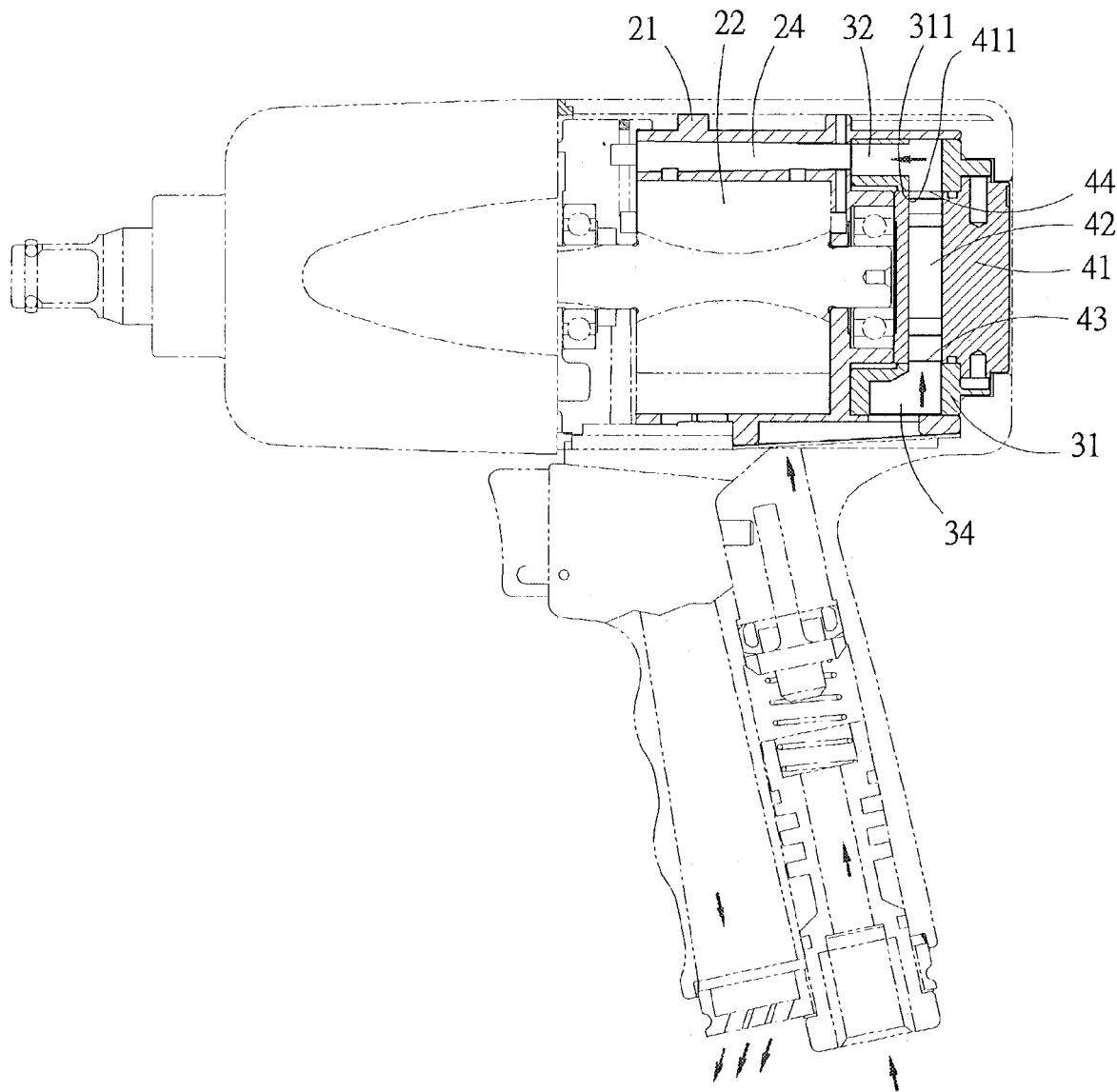
FIG. 8 is a sectional view of the airflow controlling mechanism of the present invention which is applied to a pneumatic wrench.

Referring to FIGS. 6 and 7, when the air goes from the forward vent 23 into the air chamber 22, the overlapping area between the outlet 44 and the corresponding extension vent 32 communicating with the forward vent 23 is changeable so that the amount of the air going into the forward vent 23 is changeable. Therefore, the forward rotational speed of the pneumatic tool can be adjusted.

In the prior art, the axial end faces abut against each other and the air tends to escape. In contrast, in the present invention, the air valve 30 is connected with the pneumatic cylinder 20. The circumference 411 of the base section 41 of the adjustment member 40 abuts against the inner circumference 311 of the body section 31. The openings of the airflow paths of the cylinder 20 and air valve 30 are concentratively formed on the inner circumference 311. When the adjustment member 40 controls the airflow, the position of the circumference 411 of the base section 41 is radially changeable for changing the airflow path. Therefore, the airflow can be accurately controlled without escaping.

The above embodiment is only used to illustrate the present invention, not intended to limit the scope thereof. Many modifications of the above embodiment can be made without departing from the spirit of the present invention.

What is claimed is:

1. An airflow controlling mechanism comprising:
a pneumatic cylinder having a cylindrical body with one end face, an air chamber being formed in the cylinder body, a forward and a backward vent respectively passing through the wall of one end of the cylindrical body for communicating the air chamber with outer side of the cylindrical body;
an air valve having an annular body section with one end face and an outer cylindrical surface, said, one end face of the air valve abutting against one end face of the cylindrical body, two extension vents respectively extending through the body section in predetermined direction, the openings of two ends of each extension vent being respectively positioned one end face of the body section and an inner circumferences of the body section, the openings of the two extension vents positioned on the end face of the body section respectively communicating with the forward and backward vents; and
an adjustment member having a disc-like base section with a certain thickness, the base section being coaxially accommodated in the body section, whereby the adjustment member can be turned between a clockwise position and a counterclockwise position, the circumference of the base section abutting against the inner circumference of the body section, an air passage radially extending through the base section, an opening of one end of the air passage being an outlet formed on the circumference of the base section in a predetermined position for communicating with the air passage and a corresponding extension vent.

2. The airflow controlling mechanism as claimed in claim 1, wherein the air valve has an intake passing through the body section from inner circumference to outer circumference thereof, an opening of the other end of the air passage of the adjustment member being an inlet formed on the circumference of the base section for communicating with the intake.

3. The airflow controlling mechanism as claimed in claim 2, wherein the inlet and the outlet are spaced from each other by 180 degrees and respectively positioned on two opposite sides of the base section.

4. The airflow controlling mechanism as claimed in claim 1, wherein the air valve further has two exhaustion ports respectively passing through the body section from inner circumference to outer circumference thereof, the adjustment member having two exhaustion cuts respectively formed on the circumference of the base section, whereby corresponding exhaustion passages are formed between the circumference of the base section and the inner circumference of the body section.

5. The airflow controlling mechanism as claimed in claim 1, wherein the pneumatic cylinder has an extension annular wall coaxially outward extending from one end of the cylinder body, the air valve being accommodated in the annular wall.

* * * * *